United States Patent [19]
Tsuruta

[11] Patent Number: 5,669,994
[45] Date of Patent: Sep. 23, 1997

[54] PNEUMATIC RADIAL TIRES WITH ONE-PIECE MOLDED STIFFENER HAVING AT LEAST TWO RUBBER COMPOSITIONS OF DIFFERENT HARDNESS

[75] Inventor: Makoto Tsuruta, Kodaira, Japan

[73] Assignee: Bridgestone Corporation, Tokyo, Japan

[21] Appl. No.: 518,886

[22] Filed: Aug. 24, 1995

[30] Foreign Application Priority Data

Aug. 26, 1994 [JP] Japan ..................... 6-225803
Dec. 21, 1994 [JP] Japan ..................... 6-335624
Jul. 24, 1995 [JP] Japan ..................... 7-187187

[51] Int. Cl.$^6$ ........................... B60C 15/00; B60C 15/06
[52] U.S. Cl. ........................ 152/541; 152/539; 152/543; 152/547
[58] Field of Search ........................ 152/541, 539, 152/547, 543

[56] References Cited

U.S. PATENT DOCUMENTS 4,917,166  4/1990  Iuchi ..................... 152/541 X

FOREIGN PATENT DOCUMENTS 61124  1/1994  Japan .

OTHER PUBLICATIONS

Patent Abstract of Japan vol. 015, No. 509, 24 Dec. 1991; JP A 03 224805 (Bridgestone Corp), 3 Oct. 1991.

Primary Examiner—Adrienne C. Johnstone
Attorney, Agent, or Firm—Sughrue, Mion, Zinn, Macpeak & Seas, PLLC

[57] ABSTRACT

A pneumatic radial tire, particularly a large-size and low-section profile pneumatic radial tire for truck and bus includes a stiffener disposed between a main body portion and each turnup portion of a carcass and constructed with a one-piece molded body of two or more rubber compositions having different hardnesses. A rubber composition having a highest hardness is arranged near to the main body portion of the carcass as a deformation-isolating rubber member having a greatest thickness at a position separated from a perpendicular line (Lv) drawn from an end of the turnup portion toward an outer surface of the carcass main body portion in tire cross-section, at least in a side of the tread portion among both sides sandwiching the perpendicular line (Lv), and a rubber composition having a lower hardness is arranged along an inner surface of the turnup portion.

9 Claims, 13 Drawing Sheets

FIG_2

FIG_3

FIG_11
PRIOR ART

COMPARATIVE

PNEUMATIC RADIAL TIRES WITH ONE-PIECE MOLDED STIFFENER HAVING AT LEAST TWO RUBBER COMPOSITIONS OF DIFFERENT HARDNESS

BACKGROUND OF THE INVENTION

1. Field of the Invention

This invention relates to a pneumatic radial tire comprising a radial carcass of a rubberized cord ply extending between a pair of bead cores embedded in a pair of bead portions for reinforcing a pair of sidewall portion and a tread portions. The carcass is comprised of a main body portion reinforcing the above portions and a turnup portions wound around the bead core from inside toward outside. A stiffener is arranged in each bead portion between the main body portion and the turnup portion of the carcass and taperingly extends from the bead core toward the tread portion along the main body portion of the carcass. More particularly this invention relates to a pneumatic radial tire capable of developing excellent bead portion durability for use in heavy duty vehicles such as truck and bus use.

2. Description of the Related Art

In a pneumatic radial tire running under loading, the sidewall portion is largely deflected at a position corresponding to ground contact area, while there is created so-called falling phenomenon of the bead portion in which the bead portion located outward from a rim flange in a radial direction of the tire is fallen down outside the tire. Based on such a phenomenon, a large compression strain is applied to an end part of the carcass turnup portion existing inside the bead portion, or occasionally inside the sidewall portion near the bead portion.

On the other hand, the movement of each tire constituting member along approximately a periphery of the tire is created in a region ranging from the bead portion to the sidewall portion at a position corresponding to stepping-in and kicking-out zones of the tread portion with respect to its ground contact area. Based on this movement, a shearing strain is also applied to the turnup portion. The shearing strain and the compression strain are repeatedly applied to the end portion of the turnup portion during running of the tire to promote fatigue of rubber and finally rubber cracking is apt to be caused along the end part of the turnup portion. Once rubber cracking is caused, it brings about the occurrence of separation failure as the running distance of the tire becomes longer.

Such problems of the bead portion seldom occurs in pneumatic radial tires for passenger cars used under a relatively small load, but is frequently caused in large-size pneumatic radial tires for heavy duty vehicles such as truck and bus used under a large load. Therefore, the trouble in the large-size pneumatic radial tire becomes significant with users and a solution is strongly demanded. In such a large-size pneumatic radial tire, there are known two countermeasures for solving separation failure at the turnup portion of the carcass as mentioned later.

In a first countermeasure, as shown by a partially sectional view of a tire ranging from a bead portion 1 to a sidewall portion 2 in FIG. 11, a bead portion reinforcing cord layer 8 is arranged to have an end inward from an end of a turnup portion 5b of a carcass 5 and is wound around a bead core 4 in the radial direction and extends along an outer surface of the turnup portion 5b up to an inner surface of a main body portion 5a of the carcass 5. An end of the reinforcing cord layer 8 located outside the main body portion 5a of the carcass is located outward from the end of the turnup end 5b in the radial direction. In this case, steel cords are applied to the reinforcing cord layer 8. Moreover, numeral 7A is a bead portion reinforcing rubber called a stiffener.

A second countermeasure is an improving means usually used in this field. In this countermeasure, as shown in FIG. 12, a stiffener 7A taperingly extending along the main body portion 5a of the carcass outward in the radial direction is disposed between the main body portion 5a and the turnup portion 5b of the carcass and is comprised of a hard rubber stiffener segment 7A-1 arranged along the side of the carcass main body portion inward in the radial direction and having substantially a triangular shape in section, and a soft rubber stiffener segment 7A-2 arranged along an inside surface of the carcass turnup portion 5b outward in the radial direction. A Shore A hardness of the soft rubber stiffener segment 7A-2 is not more than 55° and the volume ratio of the segment 7A-2 occupied in the stiffener 7A is made to not less than 10%, while the volume of the hard rubber stiffener segment 7A-1 (sectional area in the illustrated embodiment) is increased as far as possible. Moreover, steel cords are applicable to the bead portion reinforcing cord layer 8.

Among the countermeasures of solving the trouble of the carcass turnup portion in the large-size pneumatic radial tire, the above first countermeasure effectively utilizes a tension produced at the side of the main body portion 5a of the carcass 5 from the bead portion 1 to the sidewall portion 2 during running of the tire under heavy load to increase tensile rigidity and also increases the compression rigidity through the arrangement of the reinforcing cord layer 8 with respect to the falling phenomenon at the side of the turnup portion 5b. It has an effect of controlling the falling phenomenon based on these increased rigidities.

The second countermeasure is recognized to have an effect of mitigating the compression strain applied to the end part of the carcass turnup portion 5b, so that it can be said to be an effective technique. For this end, the separation failure in the bead portion 1 is improved by using the first and second countermeasures together as compared with the conventional tire.

However, the above countermeasures of improving bead portion durability can not sufficiently develop the aforementioned effects under present surroundings that new large-size radial tires having a more elongated service life are manufactured. It is strongly demanded to increase the recapping (retrading) number and the recapping ratio and the propagation ratio of low-section profile, large-size radial tire is increased. Particularly, it is the present state that problems of the bead portion are still a serious problem in low-section profile large-size radial tires (for truck and bus) having an aspect ratio of not more than 80, particularly not more than 70.

SUMMARY OF THE INVENTION

As a result of various studies on causes that the above countermeasures can not follow the above change of circumstances, it has been found that in addition to the compression strain acting to the carcass turnup portion as elucidated from the past, special torsional deformation force is created by the belt between deformation starting region and restoration starting region of the belt at so-called stepping-in end of the tire tread portion just before and after the tread portion comes into contact with ground during the running under load and at so-called kicking-out end just before and after the tread portion, is released at ground contacting state turns a sidewall portion through the carcass to give a large shearing strain to the turnup portion along the periphery of the bead portion. Hence such a peculiar shearing strain causes the separation failure of the turnup portion which has never been solved by the above countermeasures. That is, the invention is based on the newly found knowledge and is first accomplished by controlling the torsional force.

It is, therefore, an object of the invention to provide large-size pneumatic radial tires, particularly low-section profile, large-size radial tires for truck and bus having an aspect ratio of not more than 80, preferably not more than 70 which can sufficiently cope with the change of circumstances surrounding these tires and is excellent in bead portion durability, particularly durability to separation failure.

According to the invention, there is the provision of a pneumatic radial tire comprising a radial carcass of a rubberized cord ply extending between a pair of bead cores embedded in a pair of bead portion for reinforcing a pair of sidewall portion and a tread portion, in which the carcass is comprised of a main body portion reinforcing the above portions and a turnup portion wound around the bead core from inside toward outside, and a stiffener arranged between the main body portion and the turnup portion of the carcass and taperingly extending from the bead core toward the tread portion along the main body portion of the carcass, the improvement wherein the stiffener is one-piece molded body of at least two rubber compositions having different hardnesses, and a rubber composition having a highest hardness among these rubber compositions is arranged near to the main body portion of the carcass as a deformation-isolating rubber member having a greatest thickness at a position separated from a line (Lv), which is drawn perpendicular from an end of the turnup portion toward an outer surface of the carcass main body portion in tire cross-section, at least in a side of the tread portion among both sides sandwiching the line (Lv), and a rubber composition having a hardness lower than that of the rubber composition having the highest hardness is arranged along an inner surface of the turnup portion.

In a preferable embodiment of the invention, when a length of the low-hardness rubber composition on the line (Lv) as measured from the end of the turnup potion to a position contacting with the other member is $a_1$ and a length of the highest-hardness rubber composition on the vertical line is $b_1$ and a length of the low-hardness rubber composition outside the highest-hardness rubber composition as measured in a direction of the greatest thickness of the highest-hardness rubber composition is $a_2$ and a total length of the highest-hardness rubber composition in the direction of the greatest thickness is $b_2$, a ratio of length $b_1$/length $a_1$ and a ratio of length $b_2$/length $a_2$ satisfy a relationship of $b_2/a_2 > b_1/a_1$. In another preferable embodiment of the invention, a value of the ratio $b_1/a_1$ is less than 1.0 and a value of the ratio $b_2/a_2$ is within a range of 1.0–9.0. In the other preferable embodiment of the invention, the highest-hardness rubber composition has a Shore A hardness of 70°14 90° and the low-hardness rubber composition has a Shore A hardness of 40°–68°. In a further preferable embodiment of the invention, a bead portion reinforcing cord layer is arranged from a position separated inward from the end of the turnup portion in the radial direction along an outer surface of the turnup portion toward an inner surface of the carcass main body portion.

BRIEF DESCRIPTION OF THE DRAWINGS

The invention will be described with reference to the accompanying drawings, wherein.

DESCRIPTION OF THE PREFERRED EMBODIMENTS

The invention will be described in detail with reference to FIG. 1 sectionally showing a first embodiment of the tire inclusive of its rotating axis and FIG. 3 partially sectionally showing a third embodiment of the tire.

Figure 1:
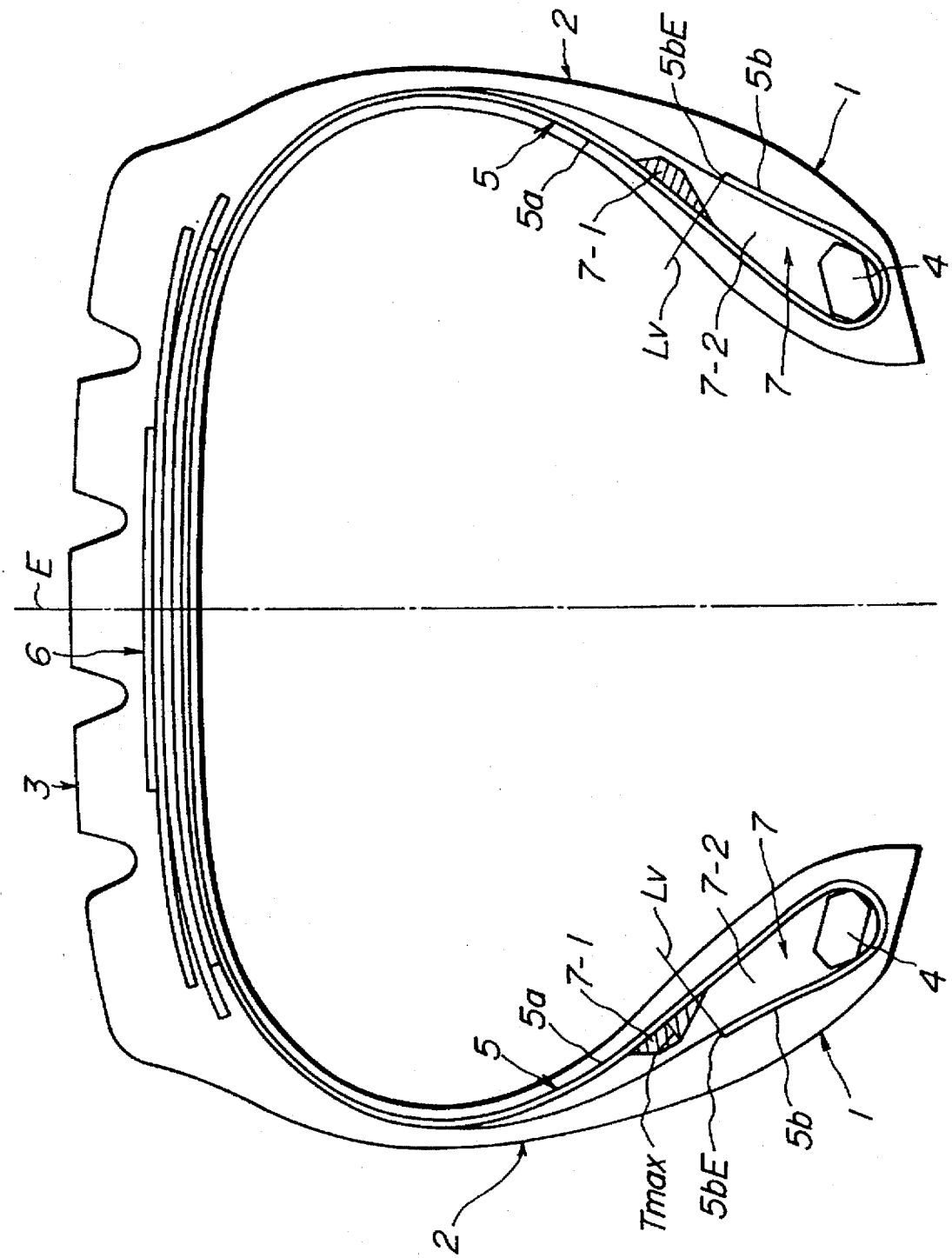
FIG. 1 is a schematically section view of a first embodiment of the pneumatic radial tire according to the invention.

In FIG. 1, the first embodiment of the pneumatic radial tire comprises a radial carcass 5 of a rubberized cord ply extending between a pair of bead cores 4 embedded in a pair of bead portions 1 and reinforcing a pair of sidewall portions 2 connected to the bead portions 1 and a tread portion 3. The radial carcass is a rubberized ply containing radially arranged steel cords or super-high strength organic fiber cords such as aramid cords or the like therein. Further, the ply number of the carcass 5 is one in case of using the steel cords and one or more in case of using the aramid cords. Moreover, a belt 6 is arranged on the outer periphery of the carcass 5 for reinforcing the tread portion 3 in accordance with custom.

For the convenience's sake, the carcass 5 is divided into a main body portion 5a serving to reinforce the sidewall portion 2 and the tread portion 3 and a turnup portion 5b wound around the bead core 4 from inside toward outside. The turnup portion 5b reinforces the bead portion 1 together with the main body portion 5a. The cord used in the carcass 5 is adaptable to have a modulus of elasticity of not less than 2500 kgf/mm$^2$, for example 15000 kgf/mm$^2$.

A stiffener 7 is disposed between the main body portion 5a and the turnup portion 5b of the carcass 5. The stiffener 7 has a triangular shape in section as a whole as shown in FIG. 1 and taperingly extends from the bead core 4 toward the tread portion 3 along the main body portion 5a of the carcass 5 to serve as a reinforcing member through a so-called rubber composition. In this case, the stiffener 7 is a one-piece molded body of two rubber compositions having different hardnesses, in which a rubber composition having a highest hardness among these rubber compositions is a portion 7-1 shown by hatched region in FIG. 1 (hereinafter abbreviated as highest hardness rubber portion) and a rubber composition having a hardness lower than that of the highest hardness rubber portion 7-1 is an unhatched portion 7-2 (hereinafter abbreviated as low hardness rubber portion).

In FIG. 1, a vertical line Lv drawn from an end 5bE of the turnup portion 5b toward an outer surface of the main body portion 5a of the carcass 5 and the highest hardness rubber portion 7-1 have a relationship as mentioned below.

That is, the highest hardness rubber portion 7-1 is arranged in a zone of the stiffener 7 near the main body portion 5a of the carcass 5 as a deformation-isolating rubber member having a greatest thickness Tmax at a position separated by a given distance from the vertical line Lv at least in a side of the tread portion 3 among both sides sandwiching the vertical line Lv. Therefore, the highest hardness rubber portion 7-1 is possible to have a maximum thickness inward from the vertical line Lv or toward the side of the bead core 4 in the radial direction in certain circumstances.

Moreover, the zone of maximum thickness Tmax is inspected in a perpendicular direction with respect to the main body portion 5a. As seen from FIGS. 1 and 3, the position indicating the maximum thickness Tmax of the highest hardness rubber portion 7-1 exists outward from the line Lv in the radial direction. Preferably, the outward position of the zone of maximum thickness Tmax in the radial direction is restricted up to a position of a maximum tire width (sidewall portion 2). When the zone of maximum thickness Tmax is separated too far from the end 5bE of the turnup portion 5b, the effect of mitigating the shearing strain at the end 5bE becomes insufficient as mentioned later.

Figure 3:
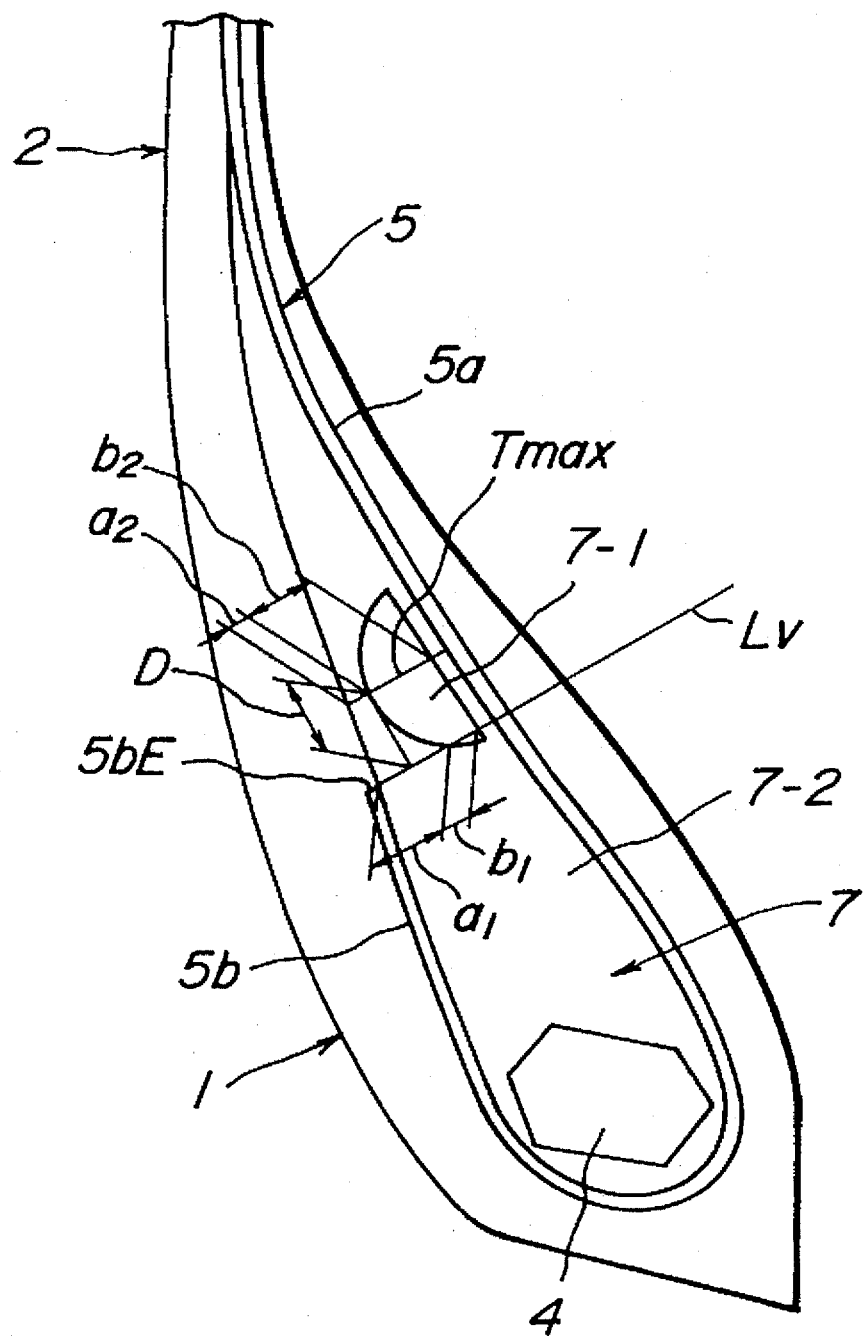
FIG. 3 is a schematically partial section view of a second embodiment of the pneumatic radial tire according to the invention.

The arrangement of the highest hardness rubber portion 7-1 close to the main body portion 5a of the carcass 5 means not only an arrangement of contacting the highest hardness rubber portion 7-1 with the main body portion 5a as shown in FIG. 1 but also an arrangement of slightly separating the highest hardness rubber portion 7-1 outward from the main body portion 5a inside the stiffener 7 as shown in FIG. 3 partially enlarging a region from the bead portion 1 to the sidewall portion 2. On the other hand, the low hardness rubber portion may be arranged along the inner surface of the turnup portion 5b.

Moreover, the sectional shape of the highest hardness rubber portion 7-1 may take not only a trapezoidal or semi-circular or crescental shape as shown in FIGS. 1 and 3 but also triangular, substantially rectangular having rounded shapes at both ends and a laminate of two rectangular shapes as mentioned in the following embodiments. In this case, it is desirable that any sectional shapes other than the rectangular shape are arranged at their wide-width side, for example, bottom side in case of the trapezoid or string side in case of the semi-circular or crescental shape toward the main body portion 5a of the carcass 5. Moreover, the distance D between the line Lv and the outer end position of the zone of maximum thickness Tmax is favorable to be 3-50 times the cord diameter of the carcass 5. The distance D is adopted as a shortest distance up to the zone of maximum thickness Tmax.

When the belt 6 is deformed from a three-dimensional arc face to a plain face and then from the plain face to the three-dimensional arc face at a both deformation starting region and a restoration starting region of the belt 6 at stepping-in end and kicking-out end of the tread portion 3 in the ground contact area of the tire during running under load, the deformation force created from the belt 6 accompanied with the above belt deformation is transmitted to the main body portion 5a of the carcass 5, whereby torsional deformation is created in the main body portion 5a, which naturally causes the torsional deformation of the sidewall portion 2 around a load acting axis located on an equatorial plane E of the tire and finally is transmitted to a turnup portion 5b existing zone in the bead portion 1.

When the deformation of such a zone is further observed in detail, it has been elucidated that the turnup portion 5b itself hardly deforms because the rigidity of the turnup portion inclusive of its end is sufficiently high owing to the presence of the cord. However only a rubber portion surrounding the turnup portion 5b and having a rigidity considerably lower than that of the turnup portion 5b or a low hardness rubber portion 7-2 having inevitably a large rigidity difference and extending along the inner surface of the turnup portion largely deforms in a direction along the periphery of the bead portion 1.

Based on such a large deformation, a large shearing strain is caused between the vicinity of the end of the turnup portion 5b and the low hardness rubber portion 7-2 along the periphery of the bead portion. As a result, it has been concluded that a new type separation failure, which has never been observed in the conventional tire, is caused from an upper end of the turnup portion 5b. Furthermore, it has been found that this failure is frequently caused in tires having a lower aspect ratio.

As previously mentioned in detail, the highest hardness rubber portion 7-1 is preferentially arranged in the stiffener 7 outward from the turnup portion 5b in the radial direction, whereby the deformation input from the low hardness rubber portion 7-2 located above the rubber portion 7-1 is isolated to largely mitigate the deformation of the low hardness rubber portion 7-2 located beneath the rubber portion 7-1. Also, the highest hardness rubber portion 7-1 contributes to control the deformation of the main body portion 5a of the carcass 5. Consequently, the shearing strain acting to the end of the turnup portion 5b in the direction along the periphery of the bead portion is considerably reduced, whereby the occurrence of separation failure in the turnup portion 5b based on the shearing strain (shearing stress) can be effectively controlled.

On the other hand, the low hardness rubber portion 7-2 is arranged along the inner surface of the turnup portion 5b, whereby the compression stress generated in the end of the turnup portion 5b during running of the tire under load can be effectively reduced, so that there is no fear of causing the separation failure based on the compression deformation. Thus, both the shearing stress and compression stress are considerably reduced to largely improve the separation resistance of the bead portion 1 or the durability thereof.

In the invention, it is effective to consider the arranging state and sectional shape of the rubber compositions as mentioned below. This will be described with reference to FIGS. 2-4. Moreover, FIG. 2 is a partially enlarged section view of FIG. 1, while FIG. 4 shows a third embodiment.

Figure 2:
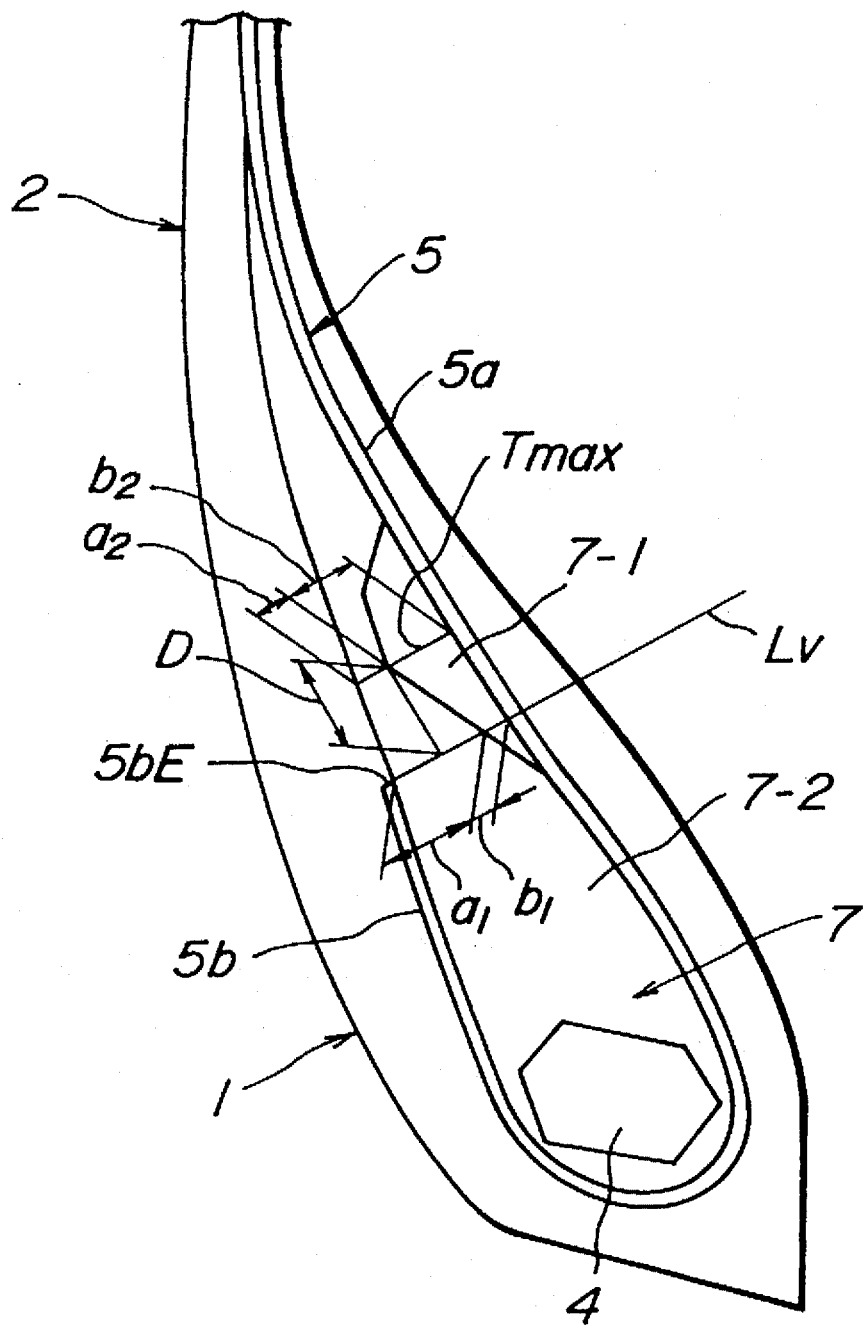
FIG. 2 is a schematically and partially enlarged section view of the first embodiment of the pneumatic radial tire according to the invention.

As to the length of the rubber composition located on the vertical line Lv in the embodiment of FIG. 2, the low hardness rubber portion 7-2 has a length $a_1$ ranging from the end 5bE of the turnup portion 5b to the other member or the main body portion 5a of the carcass 5, and the highest hardness rubber portion 7-1 has a length $b_1$. In the embodiment of FIG. 3, however, the low hardness rubber portion 7-2 has a length $a_1$ ranging from the end 5bE of the turnup portion 5b to the highest hardness rubber portion 7-1 not including a length side the main body portion 5a. The highest hardness rubber portion 7-1 has a length $b_1$ likewise the embodiment of FIG. 2.

Figure 4:
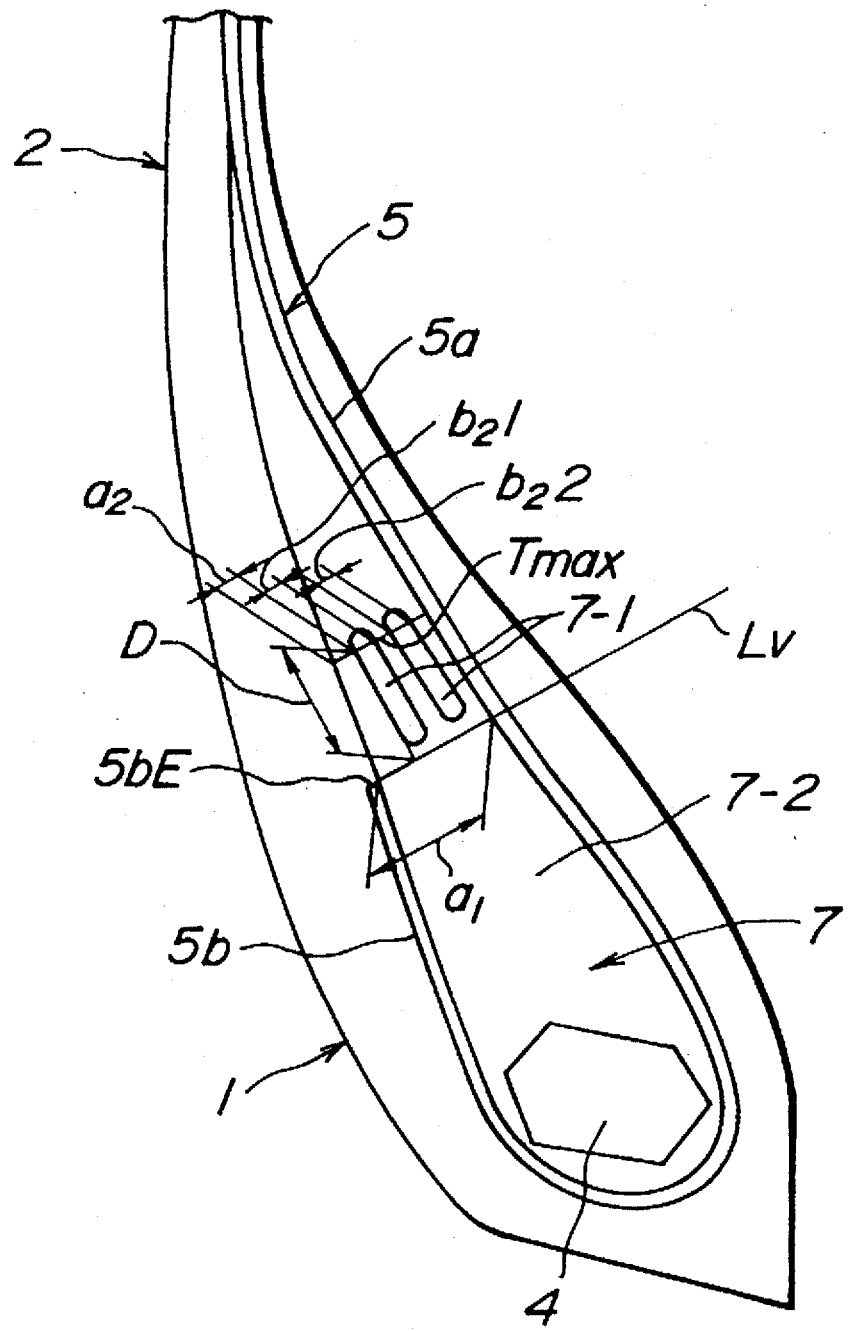
FIG. 4 is a schematically partial section view of a third embodiment of the pneumatic radial tire according to the invention.

The embodiment of FIG. 4 is different from the embodiments of FIGS. 2 and 3, in which the highest hardness rubber portion 7-1 is divided into two parts and arranged to the side of the tread portion 3 to separate away from the vertical line Lv. In this embodiment, therefore, the length $a_1$ of the low hardness rubber portion 7-2 is existent on the line Lv, but the length $b_1$ of the highest hardness rubber portion 7-1 is not existent on the vertical line Lv and is actually zero. That is, the invention includes $b_1=0$.

On the other hand, the lengths of the highest hardness rubber portion 7-1 and the low hardness rubber portion 7-2 as measured in a direction located on the maximum thickness Tmax of the highest hardness rubber portion 7-1 are determined as follows.

That is, the length $a_2$ of the low hardness rubber portion 7-2 is a length measured outward from the highest hardness rubber portion 7-1 as shown in FIGS. 2–4, which does not include a length existing side the main body portion 5a as shown in FIG. 3 or a length between two parts of the highest hardness rubber portion 7-1 as shown in FIG. 4. Further, the length $b_2$ of the highest hardness rubber portion 7-1 is a total length of ($b_21+b_22$) in the embodiment of FIG. 4.

A ratio of length $b_1$ to length $a_1$ and a ratio of length $b_2$ to length $a_2$, relationships of mutual position and mutual shape between the highest hardness rubber portion 7-1 and the low hardness rubber portion 7-2 are defined to satisfy a relationship of $b_2/a_2 > b_1/a_1$.

In order to satisfy the above relationship based on the setting of the lengths $a_1$, $b_1$, $a_2$ and $b_2$, the gauge of the low hardness rubber portion 7-2 (corresponding to the length $a_1$) is sufficiently held in the vicinity of the end 5bE of the turnup portion 5b, while the gauge of the highest hardness rubber portion 7-1 developing a lower stress mitigating function (corresponding to the length $b_1$) is thinned as far as possible, whereby the compression stress mitigating function of the rubber composition at the end of the turnup portion 5b can be enhanced.

In other words, the ratio $b_1/a_1$ is favorable to be small as far as possible, preferably less than 1.0 because it is required that the low hardness rubber portion 7-2 has a width corresponding to not less than ½ of a width of the vertical line Lv crossing the stiffener 7 in order to sufficiently mitigate the compression stress.

On the other hand, in order to satisfy the above relationship, the gauge of the low hardness rubber portion 7-2 having a lower deformation isolating function (corresponding to the length $a_2$) is thinned outward from the end 5bE of the turnup portion 5b in the radial direction as far as possible, while the maximum gauge of the highest hardness rubber portion 7-1 having a considerably high deformation isolating function (corresponding to total length $b_2$) is sufficiently held, whereby the effect of isolating the deformation input from the low hardness rubber portion 7-2 located outward from the end 5bE of the turnup portion 5b in the radial direction can considerably be enhanced.

That is, the ratio $b_2/a_2$ is favorable to be high as far as possible, preferably within a range of 1.0–9.0 because the highest hardness rubber portion 7-1 is required to have a width corresponding to not less than ½ of a width of the stiffener measured in the direction of maximum thickness Tmax in order to obtain sufficient deformation isolating effect. If the ratio $b_2/a_2$ exceeds 9.0 or the width of the low hardness rubber portion 7-2 is less than 10% of the width of the stiffener 7, a disadvantage of considerably increasing the compression strain from outside of the end 5bE of the turnup portion 5b in the radial direction occurs.

In order to sufficiently develop the deformation isolating effect, it is desirable that the Shore A hardness of the highest hardness rubber portion 7-1 is within a range of 70°–90°. On the other hand, in order to effectively reduce the compression strain acting to the end 5bE of the turnup portion 5b, it is desirable that the Shore A hardness of the low hardness rubber portion 7-2 is within a range of 40°–68°. The reason why the upper limit of Shore A hardness of the low hardness rubber portion 7-2 is 68° is due to the fact that the hardness of coating rubber for carcass ply cords is commonly set to a range of 68°–70°. If the hardness of the coating rubber exceeds this range, the low hardness rubber portion 7-2 gives undesirable strains such as compression strain and the like to the coating rubber.

The other embodiments will be described with reference to FIGS. 5–10 showing partial section views similar to FIGS. 2–4.

Figure 5:
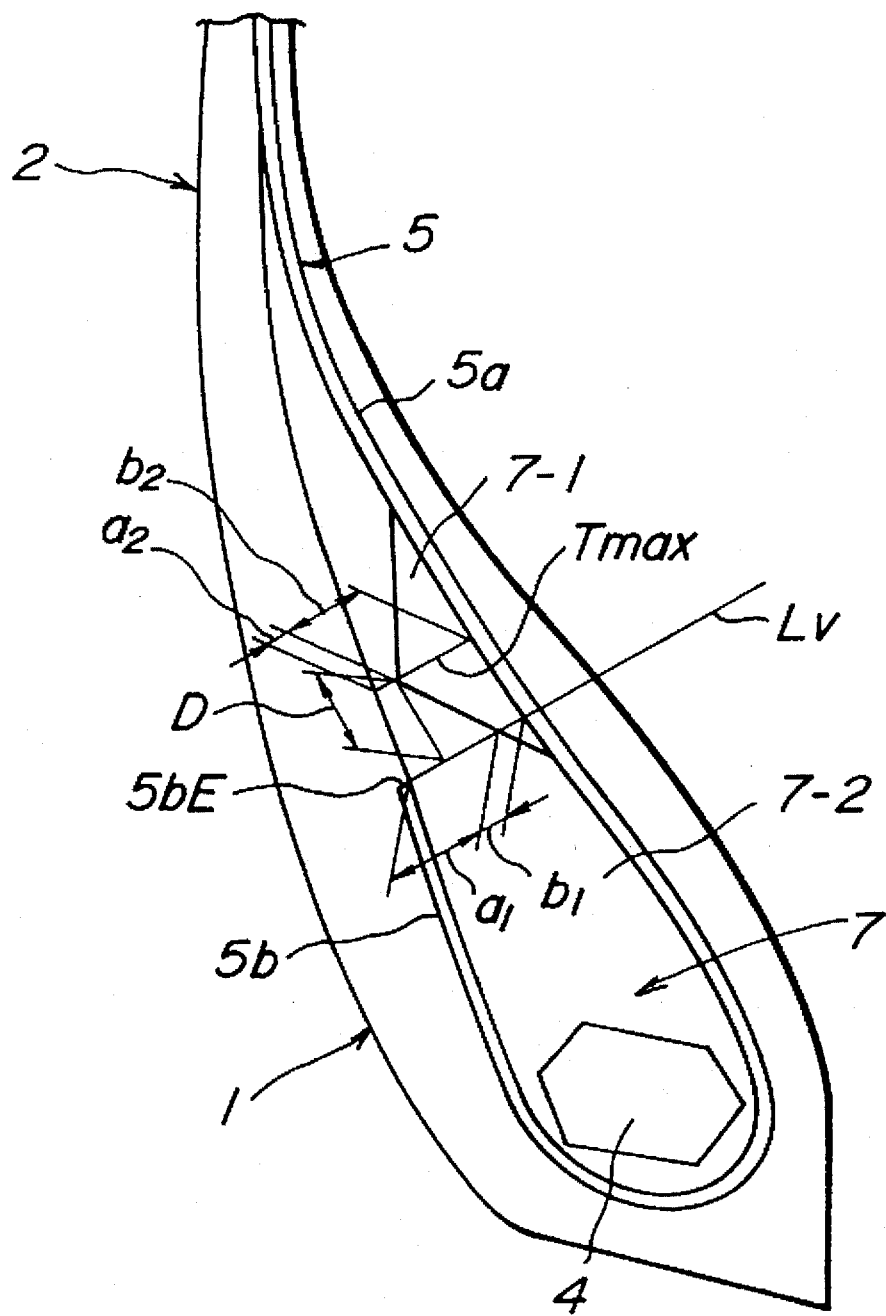
FIG. 5 is a schematically partial section view of a fourth embodiment of the pneumatic radial tire according to the invention.

The embodiment of FIG. 5 is a modified embodiment of FIG. 2, in which the sectional shape of the highest hardness rubber portion 7-1 is changed from an approximately trapezoidal shape to a triangular shape.

Figure 6:
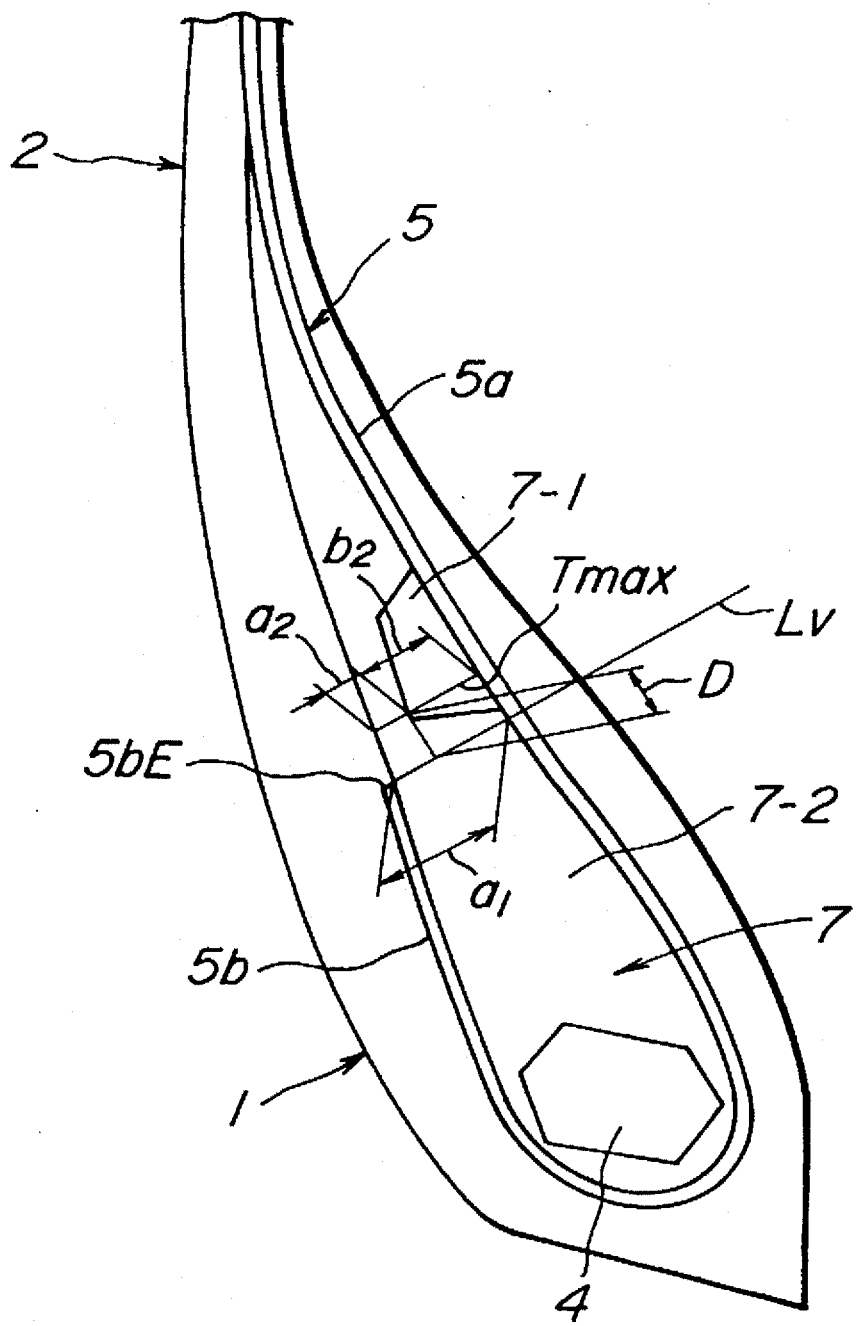
FIG. 6 is a schematically partial section view of a fifth embodiment of the pneumatic radial tire according to the invention.

The embodiment of FIG. 6 is another modified embodiment of FIG. 2, in which the highest hardness rubber portion 7-1 is arranged outward from the line Lv in the radial direction.

In the embodiments of FIGS. 7–10, a reinforcing cord layer 8 is arranged from a position separated inward from the end 5bE of the turnup portion 5b in the radial direction along the outer surface of the turnup portion 5b toward the inner surface of the main body portion 5a of the carcass 5. The reinforcing cord layer 8 contains steel cords or aramid fiber cords having a modulus of elasticity of not less than 2500 kgf/mm² (for example, 15000 kgf/mm²) likewise the cords applied to the carcass 5.

Figure 7:
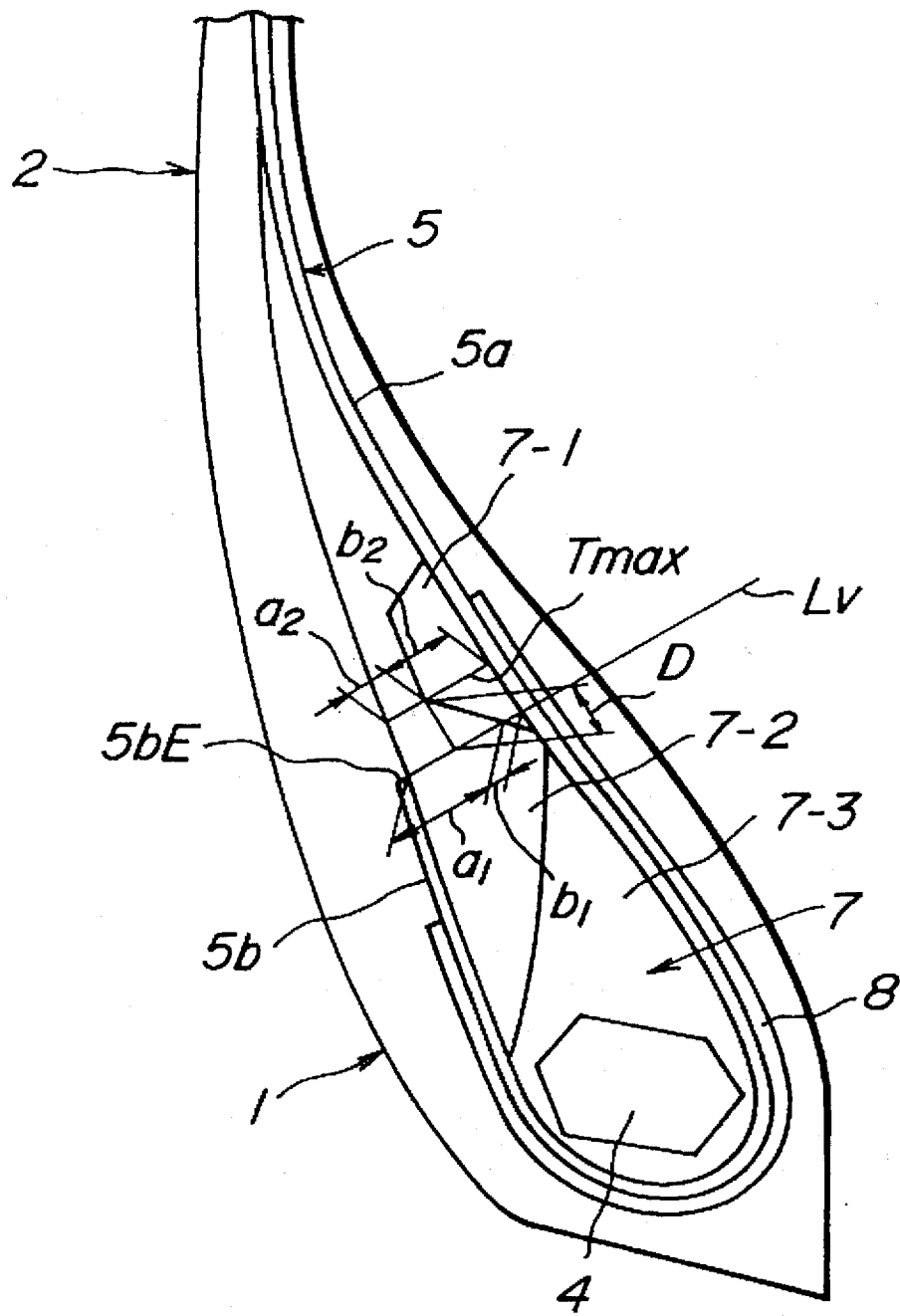
FIG. 7 is a schematically partial section view of a sixth embodiment of the pneumatic radial tire according to the invention.

In the embodiment of FIG. 7, a base rubber portion 7-3 having substantially a triangular shape in section and a hardness middle between those of the highest hardness rubber portion 7-1 and the low hardness rubber portion 7-2 is arranged in the stiffener 7 to contact with the bead core 4. The base rubber portion 7-3 is desirable to have a Shore A hardness of 70°–85°.

Figure 8:
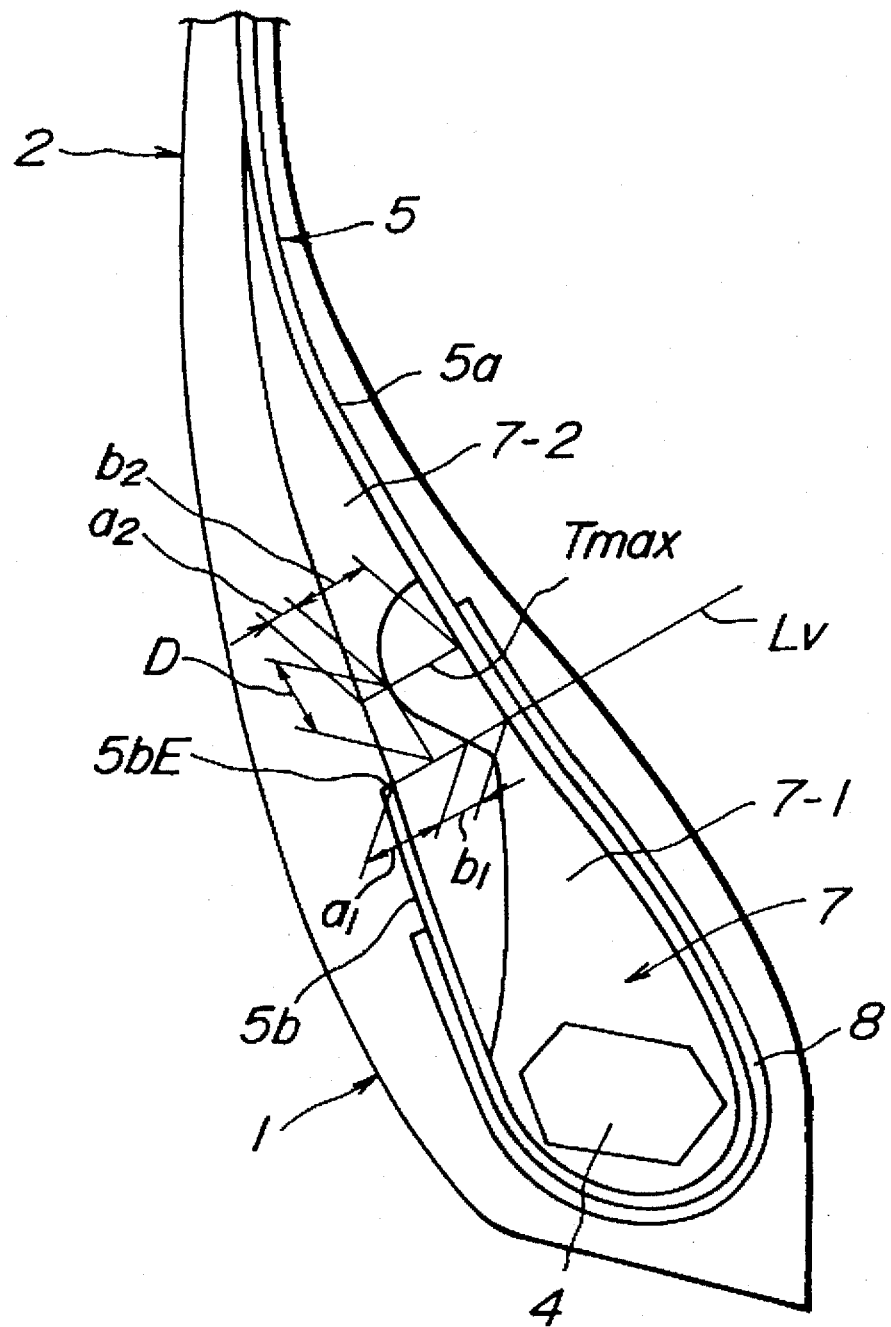
FIG. 8 is a schematically partial section view of a seventh embodiment of the pneumatic radial tire according to the invention.

In the embodiment of FIG. 8, the maximum thickness portion of the highest hardness rubber portion 7-1 is existent in both sides sandwiching the vertical line Lv, respectively. That is, the highest hardness rubber portion 7-1 is extended from a position separated outward from the end of the turnup portion in the radial direction up to the bead core 4 to have a necked region in the vicinity of the end 5bE of the turnup portion 5b.

Figure 9:
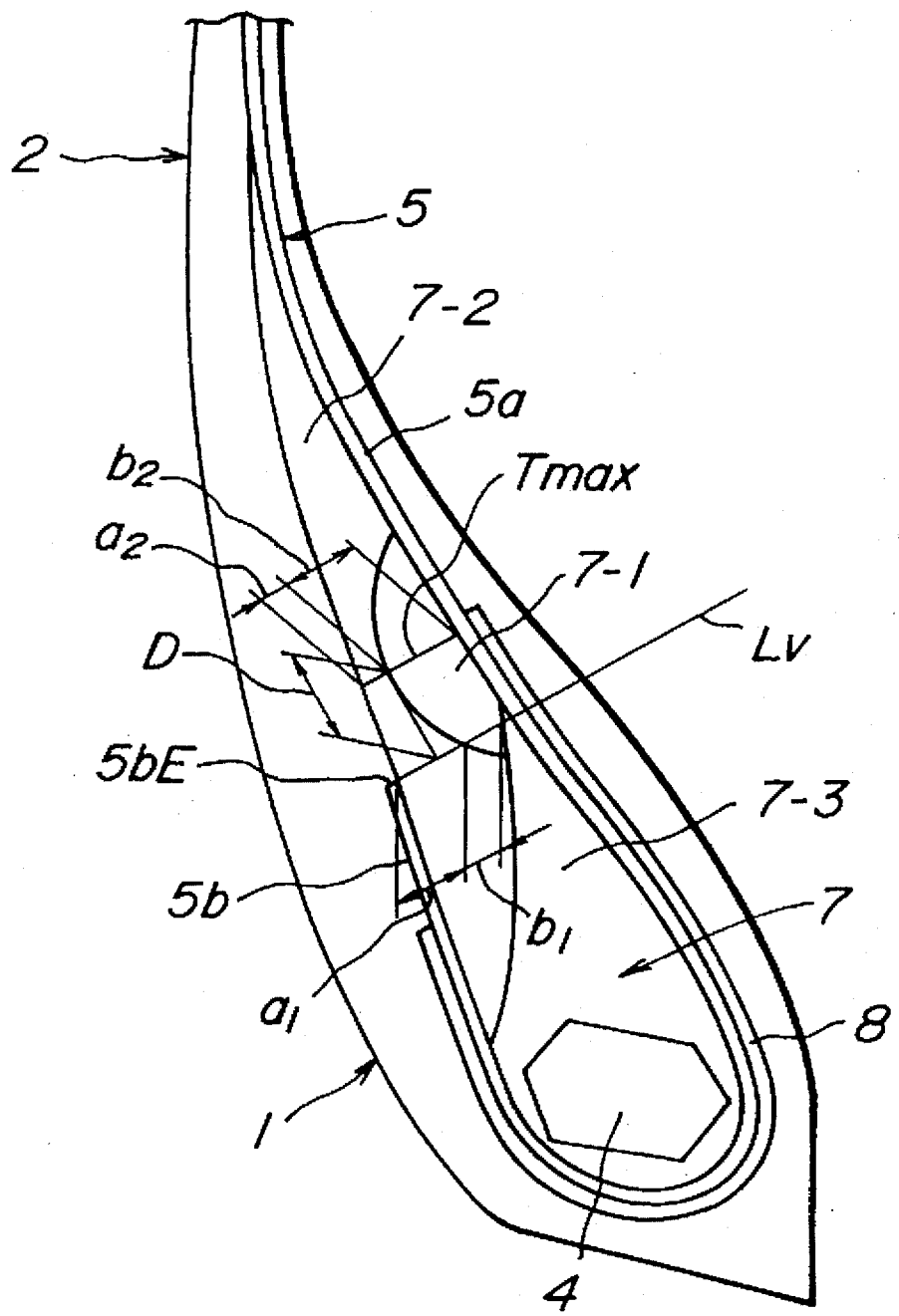
FIG. 9 is a schematically partial section view of an eighth embodiment of the pneumatic radial tire according to the invention.

In the embodiment of FIG. 9, the highest hardness rubber portion 7-1 is overlapped with the base rubber portion 7-3 in the vicinity of the vertical line Lv.

Figure 10:
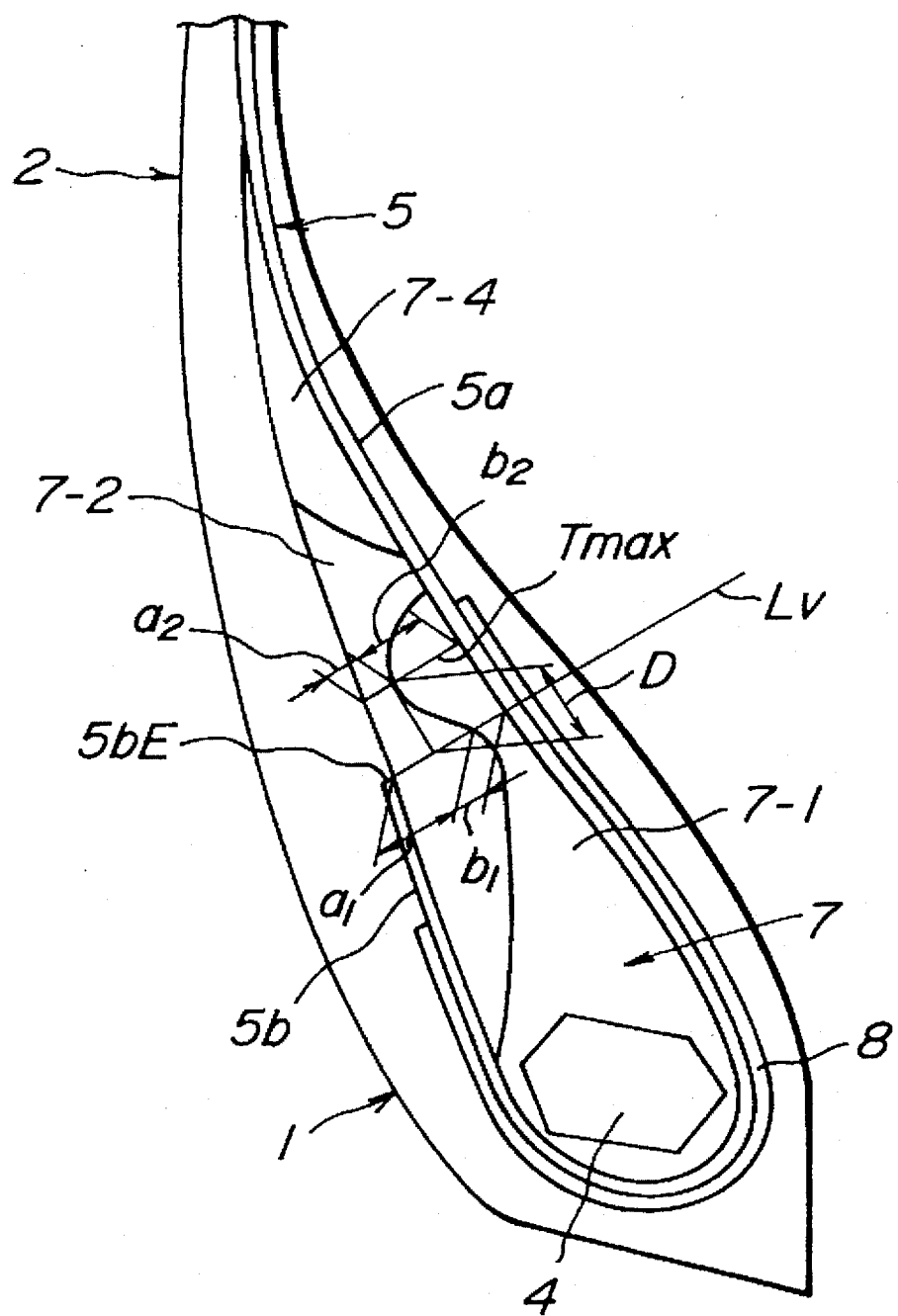
FIG. 10 is a schematically partial section view of a ninth embodiment of the pneumatic radial tire according to the invention.

The embodiment of FIG. 10 is a modified embodiment of FIG. 8, in which a region of the low hardness rubber portion 7-2 located outward from the highest hardness rubber portion 7-1 in the radial direction is replaced with a top rubber portion 7-4 having a hardness lower than that of the low hardness rubber portion 7-2, e,g, a Shore A hardness of 40°–55°.

The following examples are given in illustration of the invention and are not intended as limitations thereof.

There are provided five 15° tapered radial ply tires for truck and bus (tubeless tires) according to the invention (Examples 1–5) each having a tire size of 11/70R22.5 (aspect ratio of 0.7) and a structure shown in FIG. 1 except for the construction of the stiffener 7. The radial carcass 5 is a single ply of steel cords, and the belt 6 is comprised of four layers containing steel cords therein, the cords of which layers being crossed with each other.

Tires for conventional example and comparative example have the same tire size and structure as mentioned above. The conventional tire 1 has the structure shown in FIG. 11 including no bead portion reinforcing cord layer 8, and the comparative tire has the structure shown in FIG. 13 wherein the region of maximum thickness Tmax of the highest hardness rubber portion 7-1A is located apart from the vertical line Lv toward the side of the bead core 4.

Various dimensions of the construction of the stiffener 7 in these tires are shown in Table 1. In Table 1, the stiffener 7 shows the construction shown in respective Figure, and rubber portion 7-1 Hd and rubber portion 7-2 Hd are Shore A hardnesses (°) of the highest hardness rubber portion 7-1 and low hardness rubber portion 7-2, respectively, and volume ratio of rubber portion 7-1 (%) is a volume ratio of the highest hardness rubber portion 7-1 occupied in the stiffener 7 (%).

TABLE 1

Figure 11:
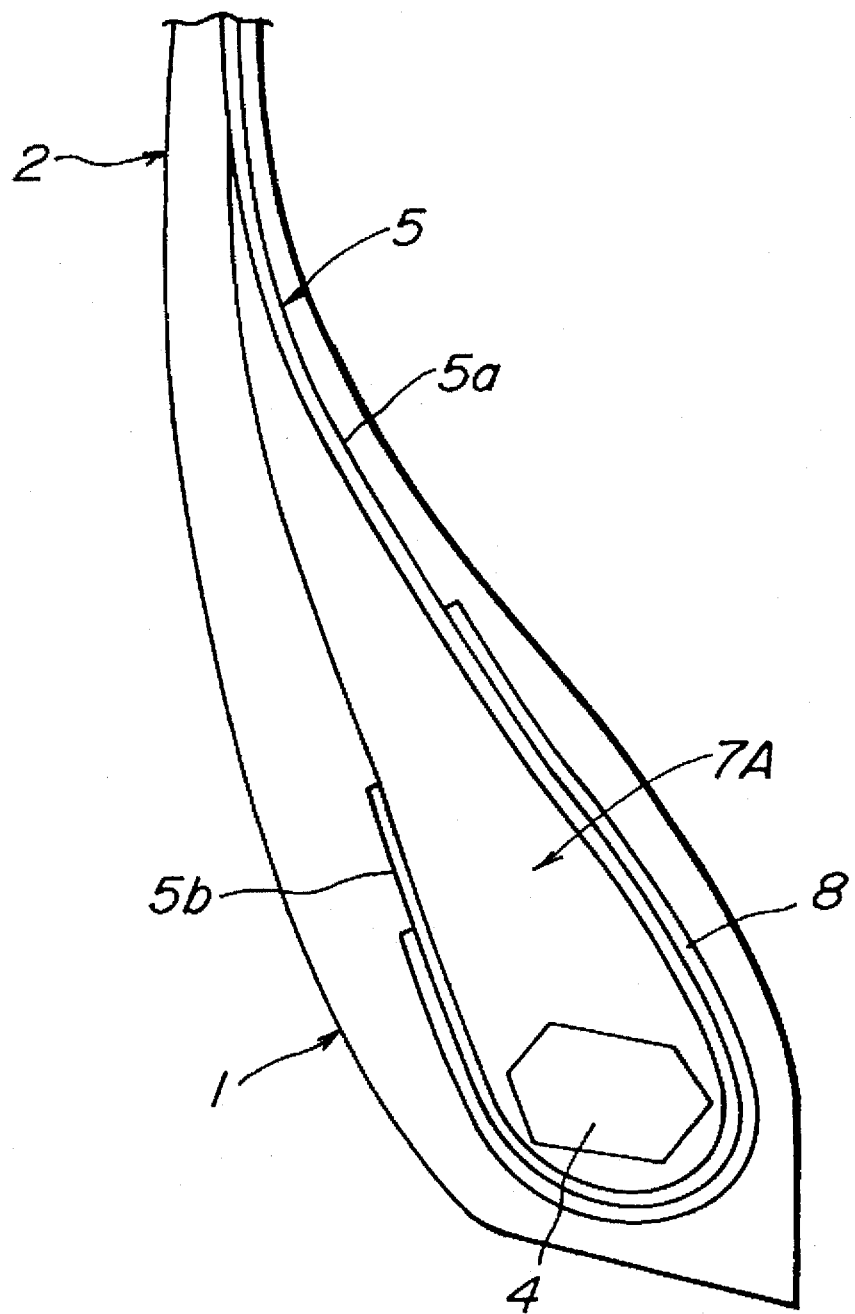
FIG. 11 is a schematically partial section view of a first embodiment of the conventional pneumatic radial tire.
Figure 13:
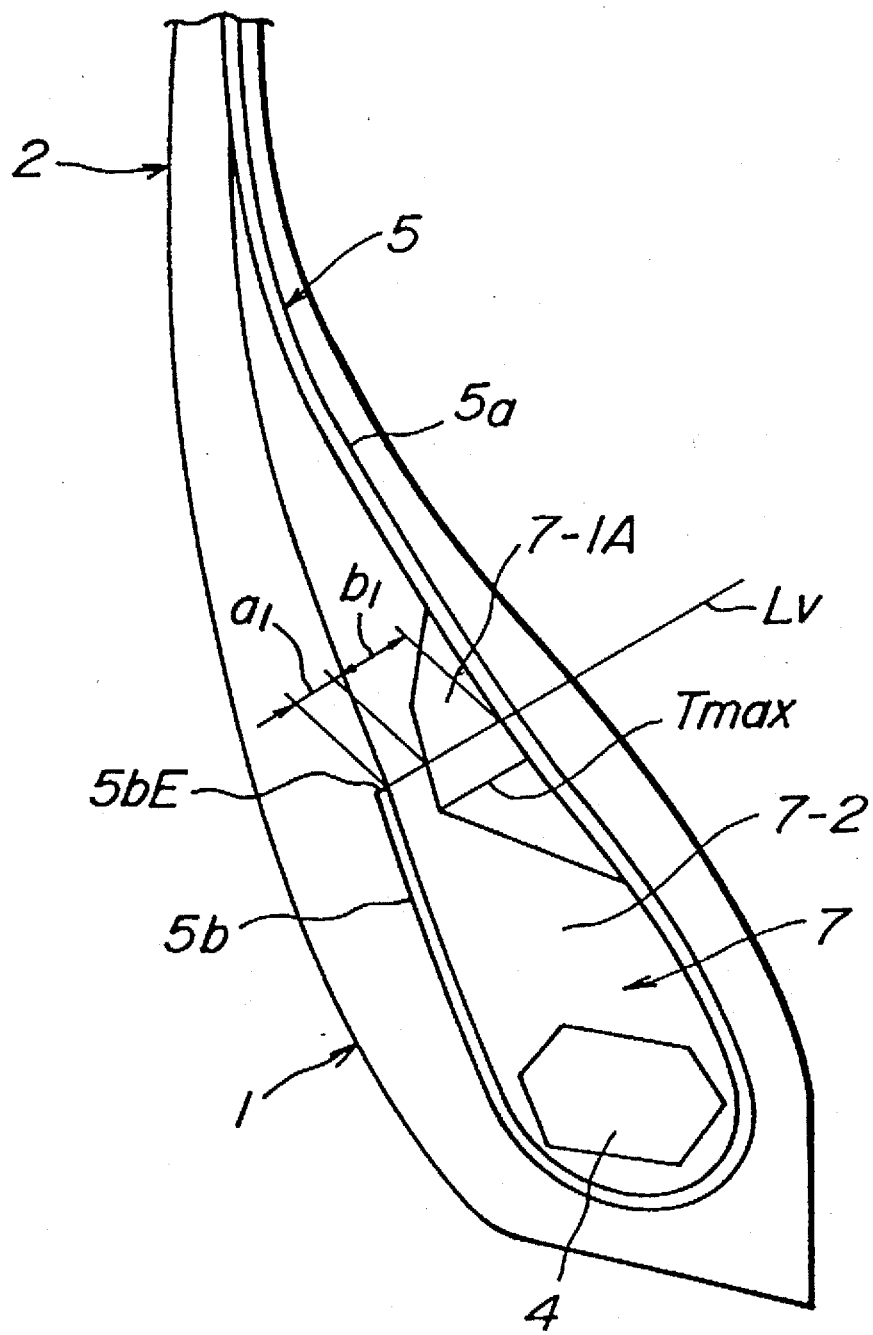
FIG. 13 is a schematically partial section view of a comparative example of the pneumatic radial tire.

| Items | Example 1 | Example 2 | Example 3 | Example 4 | Example 5 | Conventional Example 1 | Comparative Example |
|---|---|---|---|---|---|---|---|
| Stiffener 7 | FIG. 2 | FIG. 3 | FIG. 4 | FIG. 5 | FIG. 6 | FIG. 11 | FIG. 13 |
| Rubber portion 7-1 Hd | 84° | 84° | 84° | 84° | 84° | (7A) 63° | 84° |
| Rubber portion 7-2 Hd | 63° | 63° | 63° | 63° | 63° | | 63° |
| Ratio $b_1/a_1$ | 0.3 | 0.31 | 0.0 | 0.3 | 0.0 | none | 2.0 |
| Ratio $b_2/b_2$ | 2.0 | 2.69 | 2.0 | 3.0 | 2.0 | none | none |
| Distance D between Lv and Tmax (mm) | 10.0 | 9.0 | 12.5 | 10.0 | 6.0 | none | none |
| Volume ratio of rubber portion 7-1 (%) | 14 | 10 | 6 | 13 | 8 | none | 20 at 7-1A |
| Durability of bead portion (index) | 124 | 127 | 126 | 130 | 130 | 100 | 102 |

Next, there are provided tires of Examples 6–9 having the reinforcing cord layer 8 in the bead portion 1 and conventional tire 2. various dimensions of the construction of the stiffener 7 in these tires are shown in Table 2. Each item in Table 2 is the same as in Table 1.

TABLE 2

Figure 12:
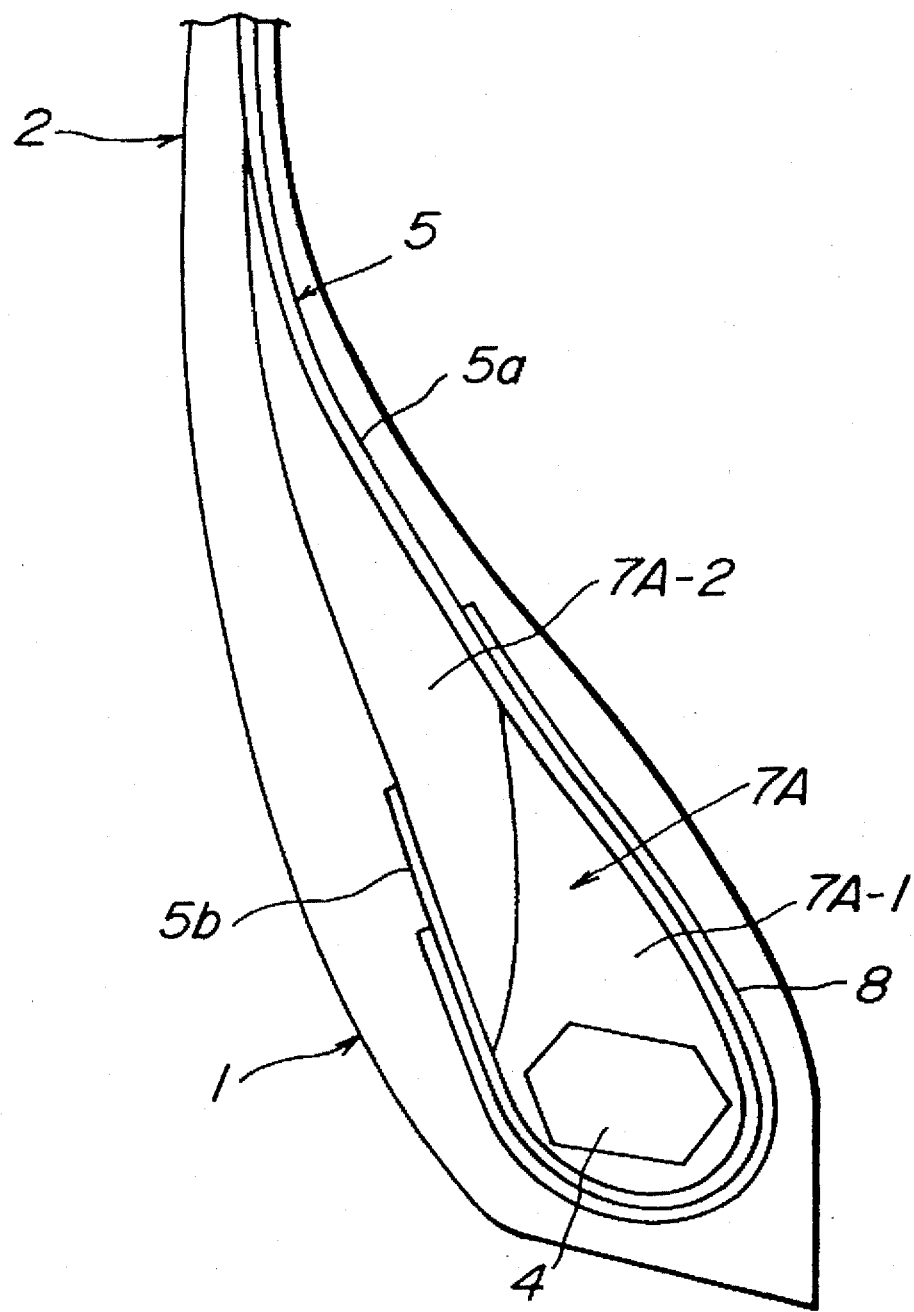
FIG. 12 is a schematically partial section view of a second embodiment of the conventional pneumatic radial tire.

| Items | Example 6 | Example 7 | Example 8 | Example 9 | Conventional Example 2 |
|---|---|---|---|---|---|
| Stiffener 7 | FIG. 7 | FIG. 8 | FIG. 9 | FIG. 10 | FIG. 12 |
| Rubber portion 7-1 Hd | 84° | 84° | 84° | 84° | 7A-1 84° |
| Rubber portion 7-2 Hd | 63° | 63° | 63° | 63° | 7A-2 63° |
| Rubber portion 7-3 Hd | 84° | — | 75° | — | |
| Rubber portion 7-4 Hd | — | — | — | 49° | 63° |
| Ratio $a_1/b_1$ | 0.25 | 0.47 | 0.50 | 0.47 | none |
| Ratio $a_2/b_2$ | 2.0 | 2.67 | 2.67 | 2.67 | none |
| Distance D between Lv and Tmax (mm) | 6.0 | 8.5 | 10.5 | 8.5 | none |
| Volume ratio of rubber portion 7-1 (%) | 10 | 48 | 14 | 46 | 37 at 7A-1 |
| Durability of bead portion (index) | 129 | 134 | 130 | 145 | 100 |

A test for bead portion durability is carried out under the following conditions with respect to each of these tires in Examples 1–9, Conventional Examples 1–2 and Comparative Example.

That is, each tire (tire-wheel assembly) inflated under an inner pressure of 8.0 kgf/cm$^2$ is pushed onto a drum under a load of 5000 kg and run thereon at a speed of 60 km/h till the occurrence of trouble in the bead portion 1, during which the running distance is measured. In the tire of Conventional Example 1, the running distance till the occurrence of trouble is 20700 km, while the running distance till the occurrence of trouble in the tire of Conventional Example 2 is 22300 km. The running distance of the other tires is represented by an index value on the basis that the value of Conventional Example 1 is 100 in the tire group of Table 1 and the value of Conventional Example 2 is 100 in the tire group of Table 2. The index values are also shown in Tables 1 and 2. The larger the index value, the better the bead portion durability.

As seen from the results of Tables 1 and 2, the bead portion durability in all tires of Examples 1–9 are considerably improved as compared with the conventional tires and comparative tire. Particularly, it should be noticed that the tire of Example 9 attains the considerably excellent durability level, which is based on the effect of arranging the top rubber portion 7-4 having a hardness lower than that of the low hardness rubber portion 7-2 outward from the low hardness rubber portion 7-2 in the radial direction and shows a profitableness of a combination of rubber compositions according to the invention.

As mentioned above, according to the invention, it is aimed at a special deformation input to the bead portion produced from the belt deformation inevitably created at the stepping-in and kicking-out of the ground contact area in the tread portion during running of the tire under load and a high hardness rubber composition effectively isolating such an input is arranged as a part of the stiffener so that a maximum thickness part of the rubber composition is located outward from a vertical line drawn from the end of the turnup portion to the main body portion of the carcass in the radial direction, whereby torsional shearing strain and stress applied to the end of the turnup portion can be largely reduced to considerably improve the durability to separation in the bead portion. Particularly, the invention can advantageously provide large-size pneumatic radial tires having an aspect ratio of not more than 0.7.

What is claimed is:

1. A pneumatic radial tire comprising; a radial carcass having a rubberized cord ply extending between a pair of bead cores, each bead core embedded in a bead portion for reinforcing a sidewall portion of said tire and a tread portion, said carcass comprised of a main body portion reinforcing the above portions and a turnup portion wound around each bead core from inside toward outside, and a stiffener arranged in each bead portion between the main body portion and the turnup portion of the carcass and taperingly extending from the bead core toward the tread portion along the main body portion of the carcass, the stiffener comprising one-piece molded body of at least two rubber compositions having different hardnesses, and a rubber composition having a highest hardness among these rubber compositions is arranged close to the main body portion of the carcass as a deformation-isolating rubber member having a greatest thickness at a position separated from a line (Lv), which is drawn perpendicular from an end of the turnup portion toward an outer surface of the carcass main body portion in tire cross-section, at least in a side of the tread portion among both sides sandwiching the line (Lv), and a rubber composition having a hardness lower than that of the rubber composition having the highest hardness is arranged along an inner surface of the turnup portion.

2. A pneumatic radial tire according to claim 1, wherein a length of the low-hardness rubber composition on the perpendicular line (Lv) as measured from the end of the turnup portion to a position contacting with the other member is $a_1$ and a length of the highest-hardness rubber composition on the perpendicular line is $b_1$ and a length of the low-hardness rubber composition outside the highest-hardness rubber composition measured perpendicular in a direction of the greatest thickness of the highest-hardness rubber composition is $a_2$ and a total length of the highest-hardness rubber composition measured perpendicularly in the direction of the greatest thickness is $b_2$, and wherein a ratio of length $b_1$/length $a_1$ and a ratio of length $b_2$/length $a_2$ satisfy a relationship: $b_2/a_2 > b_1/a_1$.

3. A pneumatic radial tire according to claim 2, wherein the highest-hardness rubber composition has a Shore A hardness of 70°–90° and the low-hardness composition has a Shore A hardness of 40°–68°.

4. A pneumatic radial tire according to claim 2, wherein a bead portion reinforcing cord layer is arranged in each bead portion from a position separated inward from the end of the turnup portion in the radial direction along an outer surface of the turnup portion toward an inner surface of the carcass main body portion.

5. A pneumatic radial tire according to claim 2, wherein a value of the ratio $b_1/a_1$ is less than 1.0 and a value of the ratio $b_2/a_2$ is within a range of 1.0–9.0.

6. A pneumatic radial tire according to claim 5, wherein a bead portion reinforcing cord layer is arranged in each bead portion from a position separated inward from the end of the turnup portion in the radial direction along an outer surface of the turnup portion toward an inner surface of the carcass main body portion.

7. A pneumatic radial tire according to claim 1, wherein the highest-hardness rubber composition has a Shore A hardness of 70°–90° and the low-hardness rubber composition has a Shore A hardness of 40°–68°.

8. A pneumatic radial tire according to claim 7, wherein a bead portion reinforcing cord layer is arranged in each bead portion from a position separated inward from the end of the turnup portion in the radial direction along an outer surface of the turnup portion toward an inner surface of the carcass main body portion.

9. A pneumatic radial tire according to claim 1, wherein a bead portion reinforcing cord layer is arranged in each bead portion from a position separated inward from the end of the turnup portion in the radial direction along an outer surface of the turnup portion toward an inner surface of the carcass main body portion.

* * * * *